United States Patent [19]

Delfino et al.

[11] 4,243,642

[45] Jan. 6, 1981

[54] METHOD FOR THE SYNTHESIS OF BORACITES

[75] Inventors: Michaelangelo Delfino, Spring Valley; Philip S. Gentile, Mt. Vernon, both of N.Y.; Gabriel M. Loiacono, Franklin Lakes, N.J.; Wallace A. Smith, Ossining, N.Y.

[73] Assignee: North American Philips Corporation, New York, N.Y.

[21] Appl. No.: 42,254

[22] Filed: May 23, 1979

[51] Int. Cl.$^3$ .............................................. C01B 35/00
[52] U.S. Cl. .................................................. 423/277
[58] Field of Search ........................................ 423/277

[56] References Cited

U.S. PATENT DOCUMENTS

| | | | |
|---|---|---|---|
| 3,384,447 | 5/1968 | Schmid | 423/277 |
| 3,801,703 | 4/1974 | Bither | 423/277 |
| 3,925,537 | 12/1975 | Bither | 423/277 |

OTHER PUBLICATIONS

Joubert, J. C. et al., "Bull. Soc. fr. Mineral Cristallogr.", vol. 95, 1972, pp. 68–74.
Bither, T. A. et al., "Journal of Solid State Chem.", Aug. 1974, pp. 302–311.

*Primary Examiner*—Edward J. Meros
*Attorney, Agent, or Firm*—Norman N. Spain

[57] ABSTRACT

A method of producing boracites is disclosed in which an aqueous mixture of a bivalent metal halide and a group 1a element borate is heated under an inert atmosphere.

4 Claims, No Drawings

METHOD FOR THE SYNTHESIS OF BORACITES

BACKGROUND OF THE INVENTION

This invention relates to a new and improved method for the synthesis of boracites.

Boracites are a class of compounds of the general formula $M_3B_7O_{13}X$ where M is a divalent metal and X is a monovalent anion.

Boracites exhibit pyroelectric and ferroelectric properties and are useful for example as infrared detectors.

In the past the boracites have been synthesized generally by vapor transport methods, for example, by the method as described by Schmid, H. J. Phys. Chem. Solids 26, 973, 1965. However this method has the disadvantages of producing a low yield of the boracite, causing the boracites to be contaminated by complex metal borates and requiring a complex and sophisticated experimental arrangement.

SUMMARY OF THE INVENTION

It is an object of the present invention to provide a new and more improved method for the synthesis of boracites. It is further an object of this invention to provide a new method for the synthesis of boracites which produces improved yields. It is still a further object of this invention to provide a method for the production of boracites which produce boracites essentially free of complex metal borates contamination. Finally it is object of this invention to provide a method of producing boracites wherein a less complex arrangement may be employed and in which there is no need for drying the reactants.

According to the invention the boracites are prepared by heating together in an aqueous medium a mixture of a metaborate of an element of Col. 1A of the Periodic Table and a metal halide.

The reaction involved in the method of the instant invention is as follows: $7GBO_2 + 3MX_2 + H_2O \rightarrow M_3B_7O_{13}X + 5GX + 2GOH$. However when G is hydrogen, water need not be employed in the reaction.

The reaction is carried out under an inert atmosphere at a temperature of 200° to 300° C. and a pressure of about 5 to 33 atmospheres.

G may be any element of Col. 1A of the Periodic Table, however, it preferably is a metal such as lithium, sodium or potassium. X is a halogen of the group consisting of bromine, iodine and chlorine.

M is bivalent metal such as nickel, zinc, copper, iron manganese, cobalt or magnesium.

As the inert atmosphere there may be employed for instance atmospheres of argon, helium, or nitrogen.

The method of the instant invention has the advantages over the prior art method of requiring less sophisticated equipment, the use of lower temperatures for instance 200°–300° C. as compared to temperatures of about 1000° C. and the preparation of boracites of a very high yield that are essentially free of metal borate contamination. Further the method of the instant invention requires much shorter reaction times then the method of the prior art. Finally the method of the instant invention is much more versatile than that of the prior art in that it is applicable to the metals which also exhibit monovalent oxidation states, such as copper.

DESCRIPTION OF THE PREFERRED EMBODIMENTS

The invention will now be described in greater detail with reference to the following example.

EXAMPLE 34.8 g of $LiBO_2$, 81.8 g of $NiBr_2 \cdot 3H_2O$ and 36.4 g of $H_2O$ were placed in a 250 cc paar pressure reaction vessel. The reaction mixture was heated to a temperature of 270° C. and a pressure of 300 psi for 60 hours and then rapidly cooled to room temperature. The product was washed with boiling water to dissolve unreacted material as well as water soluble by-products. The boracite yield was estimated at 87%. Some nickel borate (about 5%) of material which was estimated to be $NiB_2O_4 \cdot (H_2O)X$ was also found. When the reaction was repeated by the employment of a deoxygenated water solvent and employing an inert atmosphere such as argon the yield of the boracite was increased to 95%.

The boracite produced by this example was found to have the formula $Ni_3B_7O_{13}Br$.

The following additional boracites were prepared according to the method of the example, the details and the results of which syntheses are shown in the following table.

TABLE
RESULTS OF BORACITE SYNTHESES

| Bor-acite | T (K) | P(atm.) | t (h) | Atm. | $MX_2$ | $LiBO_2$ | $H_2O$ | Yield (%) |
|---|---|---|---|---|---|---|---|---|
| Ni–Br | 540 | 11 | 60 | air | 65.6 | 34.8 | 1.8 | 38 |
| Ni–Br | 540 | 11 | 60 | argon | 65.5 | 34.8 | 1.8 | 55 |
| Ni–Br | 540 | 11 | 60 | oxygen | 65.5 | 34.8 | 1.8 | 12 |
| Ni–Br | 540 | 26 | 60 | air | 65.5 | 34.8 | 21.8 | 87 |
| Ni–Br | 540 | 26 | 60 | argon | 65.5 | 34.8 | 21.8 | 95 |
| Ni–Br | 490 | 20 | 40 | argon | 65.5 | 34.8 | 21.8 | 95 |
| Zn–Br | 570 | 33 | 24 | argon | 135.2 | 69.6 | 16.0 | 98 |
| Zn–Cl | 525 | 18 | 24 | argon | 81.8 | 69.6 | 16.0 | 95 |
| Cu–Cl | 525 | 18 | 26 | argon | 80.6 | 69.6 | 16.0 | 91 |
| Mn–Cl | 500 | 5 | 24 | argon | 75.6 | 69.6 | 14.0 | 95 |
| Co–Br | 475 | 6 | 18 | air | 66.2 | 34.8 | 9.0 | — |
| Mg–Cl | 475 | 5 | 18 | air | 57.7 | 17.4 | 9.0 | nm* |
| Mn–I | 475 | 5 | 18 | air | 45.0 | 17.4 | 9.0 | nm* |

T = reaction temperature in °K., P = pressure employed in atmosphere and t = reaction time in hours.
* = not measured As will be noted from the results shown there is a very significant improvement in the yield of the boracites when an inert atmosphere is employed as compared with the results when air or oxygen is employed.

What is claimed is:

1. A method for the production of boracites of the formula $M_3B_7O_{13}X$ wherein M is a bivalent metal and X is an element selected from the group consisting of Br, I and Cl, comprising heating at a temperature of 200° to 300° C. and at a pressure of 5 to 33 atmospheres, a mixture of a compound of the formula $GBO_2$ wherein G is an element of Col. 1A of the Periodic Table and a compound of the formula $MX_2$ where M is a bivalent metal and X is an element selected from the group consisting of Br, I and Cl in an inert atmosphere with the provision that the reaction is carried out in an agueous solvent when G is other than hydrogen.

2. The method of claim 1 wherein G is an element selected from a group consisting of Li, Na, and K and the reaction is carried out in an aqueous solvent.

3. The method of claim 1 wherein M is a bivalent metal selected from the group consisting of Ni, Zn, Cu, Mn, Co, Mg, Fe, and Cr.

4. The method of claim 3 wherein the reaction mixture is heated for 12 to 60 hours.

* * * * *